United States Patent
Bang et al.

(10) Patent No.: US 10,575,014 B2
(45) Date of Patent: *Feb. 25, 2020

(54) IMAGE ENCODING METHOD USING A SKIP MODE, AND A DEVICE USING THE METHOD

(71) Applicants: Electronics and Telecommunications Research Institute, Daejeon (KR); UNIVERSITY-INDUSTRY COOPERATION GROUP OF KYUNG HEE UNIVERSITY, Yongin-si (KR)

(72) Inventors: Gun Bang, Daejeon-si (KR); Won Sik Cheong, Daejeon-si (KR); Gi Mun Um, Daejeon-si (KR); Nam Ho Hur, Daejeon-si (KR); Gwang Hoon Park, Seongnam-si (KR); Kyung Yong Kim, Suwon-si (KR)

(73) Assignees: Electronics Telecommunications Research Institute, Daejeon (KR); UNIVERSITY-INDUSTRY COOPERATION OF KYUNG HEE UNIVERSITY, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,627

(22) Filed: Oct. 4, 2018

(65) Prior Publication Data

US 2019/0037239 A1 Jan. 31, 2019

Related U.S. Application Data

(63) Continuation of application No. 14/005,493, filed as application No. PCT/KR2012/002763 on Apr. 12, 2012, now Pat. No. 10,142,623.

(30) Foreign Application Priority Data

Apr. 12, 2011 (KR) .................. 10-2011-0033780
Apr. 12, 2012 (KR) .................. 10-2012-0037914

(51) Int. Cl.
*H04N 19/593* (2014.01)
*H04N 19/597* (2014.01)
(Continued)

(52) U.S. Cl.
CPC ......... *H04N 19/593* (2014.11); *H04N 19/107* (2014.11); *H04N 19/176* (2014.11);
(Continued)

(58) Field of Classification Search
CPC ................................................. H04N 19/593
(Continued)

(56) References Cited

U.S. PATENT DOCUMENTS

| 2011/0292044 A1 | 12/2011 | Kim et al. |
| 2011/0292994 A1 | 12/2011 | Lim et al. |
| 2015/0036749 A1 | 2/2015 | Jeon et al. |

FOREIGN PATENT DOCUMENTS

| CN | 101971632 A | 2/2011 |
| EP | 2288163 A2 | 2/2011 |

(Continued)

OTHER PUBLICATIONS

Chinese Office Action dated Mar. 3, 2016, in counterpart Chinese Application No. 201280017112.7 (10 pages in English, 10 pages in Chinese).

(Continued)

*Primary Examiner* — James M Anderson, II
(74) *Attorney, Agent, or Firm* — NSIP Law

(57) ABSTRACT

Disclosed are an image encoding method using a skip mode and a device using the method. The image encoding method (Continued)

may comprise the steps of: judging whether there is residual block data of a prediction target block on the basis of predetermined data indicating whether residual block data has been encoded; and, if there is residual block data, restoring the prediction target block on the basis of the residual block data and an intra-screen predictive value of the prediction target block. Consequently, encoding and decoding efficiency can be increased by carrying out the encoding and decoding of screen residual data only for prediction target blocks where there is a need for a residual data block in accordance with screen similarity.

15 Claims, 13 Drawing Sheets

(51) Int. Cl.
*H04N 19/176* (2014.01)
*H04N 19/46* (2014.01)
*H04N 19/96* (2014.01)
*H04N 19/107* (2014.01)
*H04N 19/44* (2014.01)

(52) U.S. Cl.
CPC ............. *H04N 19/44* (2014.11); *H04N 19/46* (2014.11); *H04N 19/597* (2014.11); *H04N 19/96* (2014.11)

(58) Field of Classification Search
USPC ........................................ 375/240.01–240.29
See application file for complete search history.

(56) References Cited

FOREIGN PATENT DOCUMENTS

| KR | 10-2005-0026318 A | 3/2005 |
| KR | 10-2007-0099390 A | 10/2007 |
| KR | 10-2010-0081984 A | 7/2010 |
| KR | 10-2011-0011505 A | 2/2011 |

OTHER PUBLICATIONS

International Search Report dated Nov. 1, 2012 in counterpart International Application No. PCT/KR2012/002763 (6 pages, in Korean, with complete English translation).

IMAGE ENCODING METHOD USING A SKIP MODE, AND A DEVICE USING THE METHOD

CROSS-REFERENCE TO RELATED APPLICATIONS

This application is a continuation of U.S. application Ser. No. 14/005,493 having a 371(c) date of Sep. 16, 2013, now U.S. Pat. No. 10,142,623, issued on Nov. 27, 2018, which is a U.S. National Stage Application of International Application No. PCT/KR2012/002763, filed on Apr. 12, 2012, which claims the benefit under 35 USC 119(a) and 365(b) of Korean Patent Application No. 10-2011-0033780, filed on Apr. 12, 2011 and Korean Patent Application No. 10-2012-0037914, filed on Apr. 12, 2012, in the Korean Intellectual Property Office, the entire disclosures of which are incorporated herein by reference for all purposes.

TECHNICAL FIELD

The present invention relates to a decoding method and apparatus, and more particularly, to a video decoding method using a skip mode and an apparatus using the same.

BACKGROUND ART

Recently, the demand for high resolution and high quality video such as a high definition (HD) video and an ultra high definition (UHD) video has increased in various applications. As resolution and quality of video data have increased, a data amount relatively increases as compared to existing video data. Therefore, when the video data are transmitted using media such as an existing wired and wireless broadband line or are stored using the existing storage media, transmission costs and storage costs increase. In order to solve these problems occurring due to the increase in the resolution and quality of the video data, high efficiency video compression technologies may be utilized.

As the video compression technologies, there are various technologies such as an inter prediction technology of predicting pixels values included in a current picture from pictures before or after the current picture, an intra prediction technology of predicting pixel values included in a current picture using pixel information in the current picture, and an entropy coding technology of allocating a short code to a value having high appearance frequency and a long code to a value having low appearance frequency, and the like. The video data may be effectively compressed, transmitted, or stored by using the video compression technologies.

DISCLOSURE

Technical Problem

The present invention provides a method of recovering a video having high pixel correlation.

The present invention also provides an apparatus for performing a recovering method on a video having high pixel correlation.

Technical Solution

In an aspect, a video decoding method is provided. The video decoding method includes: determining whether residual block information of a prediction object block is present based on predetermined information representing whether the residual block information is encoded; and recovering the prediction object block based on an intra prediction value and the residual block information when the residual block information is present. The video decoding method may further include: recovering the prediction object block by using only the intra prediction value of the prediction object block when the residual block information is absent. The intra prediction value may be a value calculated based on a reference pixel value of the prediction object block and may be a value predicted while having directivity according to a predetermined intra prediction mode or may be an arithmetic average value or a weight average value of reference pixels. The video decoding method may further include: decoding reference pixel value information selectively used upon performing the intra prediction on the prediction object block. The intra prediction value may be an intra prediction value calculated based on the reference pixel value selected in consideration of characteristics of the reference pixels of the prediction object block. The reference pixel value selected in consideration of the characteristics of the reference pixels of the prediction object block may be a reference pixel value selected by comparing similarity of an upper left pixel and a left reference pixel of the prediction object block with similarity of an upper left pixel and an upper reference pixel of the prediction object block. The intra prediction value may be a value calculated based on an average value or a sum of weight values of values predicted by a plurality of intra prediction mode. The predetermined information representing whether the residual block information is encoded may be information induced from peripheral block information of the already decoded prediction object block.

In another aspect, a video decoding apparatus is provided. The video decoding apparatus includes: an entropy decoder decoding information representing whether residual block data are parsed; and a predictor determining whether at least one of residual block information and prediction block generation information of a prediction object block is present, based on decoded intra skip flag information. The predictor may be a predictor recovering the prediction object block based on an intra prediction value and the residual block information of the prediction object block when the residual block information is present. The predictor may be a predictor recovering the prediction object block by using only the intra prediction value of the prediction object block when the residual block information is absent. The intra prediction value may be a value calculated based on a reference pixel value of the prediction object block and may be a value predicted while having directivity according to a predetermined intra prediction mode or may be an arithmetic average value or a weight average value of reference pixels. The predictor may be a predictor performing the intra prediction based on only the selectively used reference pixel value information. The intra prediction value may be an intra prediction value calculated based on the reference pixel value selected in consideration of characteristics of the reference pixels of the prediction object block. The reference pixel value selected in consideration of the characteristics of the reference pixels of the prediction object block may be a reference pixel value selected by comparing similarity of an upper left pixel and a left reference pixel of the prediction object block with similarity of an upper left pixel and an upper reference pixel of the prediction object block. The intra prediction value may be a value calculated based on an average value or a sum of weight values of values predicted by a plurality of intra prediction mode. The information representing whether the residual block data are parsed may be information induced from peripheral block information of the already decoded prediction object block.

Advantageous Effects

A video decoding method using a skip mode and the apparatus using the same in accordance with the exemplary embodiment of the present invention perform the encoding and decoding on residual information of a screen for only the prediction object block requiring the residual information block on the basis of the screen similarity, thereby making it possible to increase the encoding and decoding efficiency.

MODE FOR INVENTION

Hereinafter, exemplary embodiments of the present invention will be described in detail with reference to the accompanying drawings. However, in describing exemplary embodiments of the present invention, well-known functions or constructions will not be described in detail since they may unnecessarily obscure the understanding of the present invention.

It is to be understood that when any element is referred to as being "connected to" or "coupled to" another element, it may be connected directly to or coupled directly to another element or be connected to or coupled to another element, having the other element intervening therebetween. Further, in the present specification, in the case of describing "including" a specific component, it is to be understood that additional components other than a corresponding component are not excluded, but may be included in exemplary embodiments or the technical scope of the present invention.

Terms used in the specification, 'first', 'second', etc., may be used to describe various components, but the components are not to be construed as being limited to the terms. That is, the terms are used to distinguish one component from another component. For example, the 'first' component may be named the 'second' component, and vice versa, without departing from the scope of the present invention.

In addition, components described in exemplary embodiments of the present invention are independently shown only in order to indicate that they perform different characteristic functions. Therefore, the components that are independently shown do not mean that each of the components may not be implemented as one hardware or software. That is, each of the components is divided for convenience of explanation, a plurality of components may be combined with each other to thereby be operated as one component or one component may be divided into a plurality components to thereby be operated as the plurality of components, which are included in the scope of the present invention as long as it departs from essential characteristics of the present invention.

In addition, some of components may not be indispensable components performing essential functions of the present invention, but be selective components improving only performance thereof. The present invention may also be implemented only by a structure including the indispensible components except for the selective components, and the structure including only the indispensible components is also included in the scope of the present invention.

Figure 1:
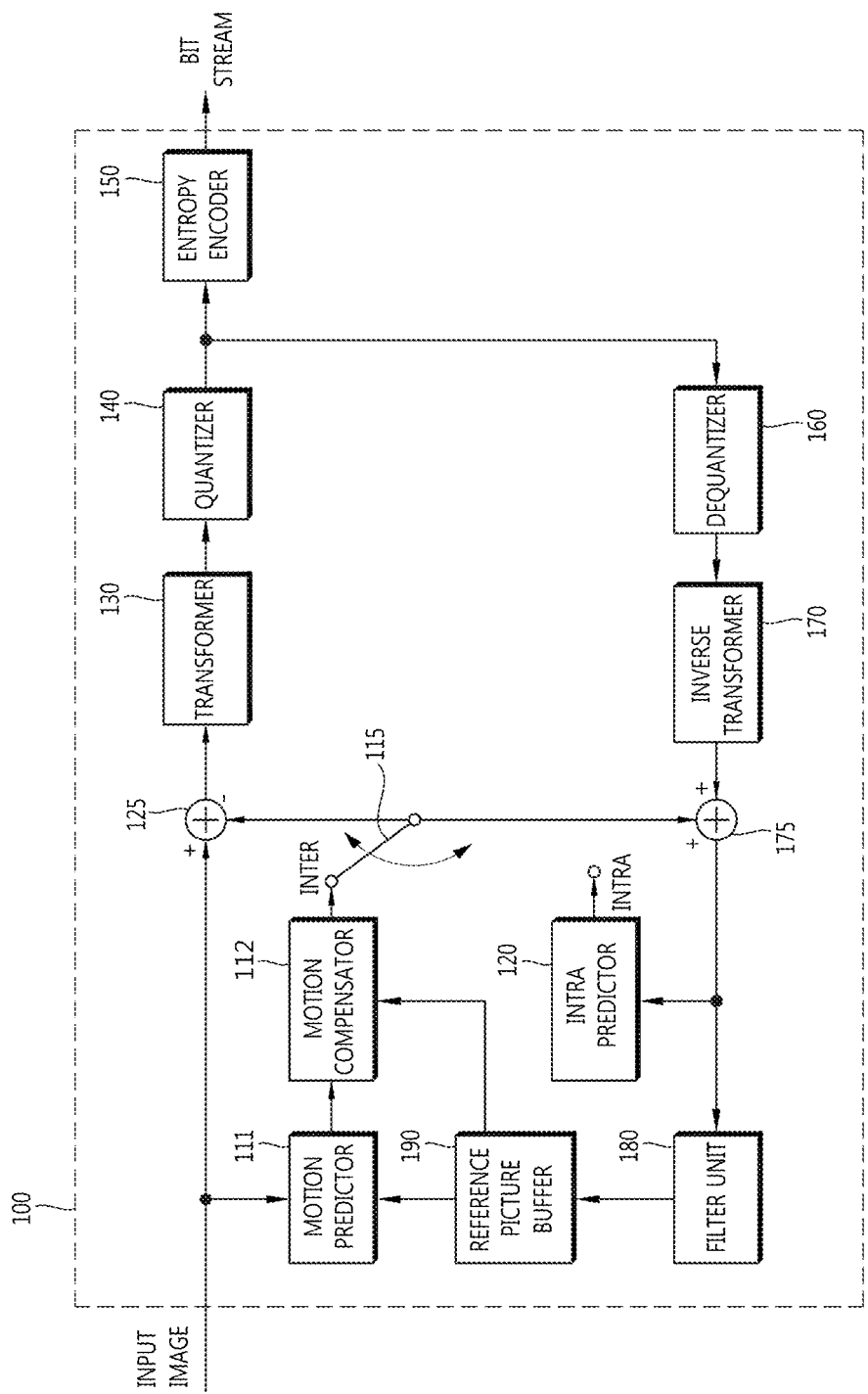
FIG. 1 is a block diagram illustrating a video encoding apparatus in accordance with an exemplary embodiment of the present invention.

FIG. 1 is a block diagram illustrating a video encoding apparatus in accordance with an exemplary embodiment of the present invention.

Referring to FIG. 1, an apparatus 100 for encoding video includes a motion predictor 111, a motion compensator 112, an intra predictor 120, a switch 115, a subtracter 125, a transformer 130, a quantizer 140, an entropy encoder 150, a dequantizer 160, an inverse transformer 170, an adder 175, a filter unit 180, and a reference video buffer 190.

The apparatus 100 for encoding video performs encoding on an input video by an intra mode (intra prediction mode) or an inter mode (inter prediction mode) and outputs bit streams. Hereinafter, in the exemplary embodiment of the present invention, the intra prediction may be used as the same meaning as intra prediction and the inter prediction may be used as the same meaning as inter prediction. In order to determine an optimal prediction method for a prediction unit, an intra prediction method and an inter prediction method for a prediction unit may be selectively used. The apparatus 100 for encoding video may generate a prediction block for an original block of the input video and then, encode a difference between the original block and the prediction block.

In the case of the intra prediction mode, the intra predictor 120 (alternatively, the intra-picture predictor may be used as a term having the same meaning) generates a prediction block by performing spatial prediction using pixel values of the already encoded block around a current block.

The exemplary embodiment of the present invention may determine whether to encode a residual block that is a difference value between prediction values of the original block and a prediction object block, on the basis of pixel correlation of video for prediction values of the prediction object block calculated by performing the intra prediction on the prediction object block. For example, in the case of a block having high pixel correlation like depth video, information in which the residual block is not encoded and the prediction object block is constructed (generated) by only the prediction values may be transmitted to a decoder. Video encoding efficiency may be improved by the method. The information regarding whether the residual block and prediction block generation information is encoded may be represented based on any flag information. For example, (1) when a flag value is 0, the prediction object block is a block in which the residual block is also encoded and therefore, the entropy decoder decodes, dequantizes, and inversely transforms the residual block information and then, adds the information to the prediction value of the prediction object block generated from the predictor, thereby making it possible to recover the video. (2) When a flag value is 1, the prediction object block is a block in which the residual block is not encoded and the recovered video may be generated by only the prediction value of the prediction object block generated from the predictor.

In the case of the inter prediction mode, the motion predictor 111 searches a region optimally matched with the input block in a reference video stored in the reference video buffer 190 during the motion prediction process to obtain a motion vector. The motion compensator 112 performs motion compensation using the motion vector to generate the prediction block.

The subtracter 125 may generate the residual block by a difference between the input block and the generated prediction block. The transformer 130 may perform transform on the residual block to output transform coefficients. Further, the quantizer 140 quantizes the input transform coefficients on the basis of quantization parameters to output quantized coefficients. The entropy encoder 150 performs entropy encoding on the input quantized coefficients according to probability distribution to output bit streams.

At the time of performing the inter prediction encoding, the currently encoded video should be decoded and stored so as to be used as the reference video. Therefore, the quantized coefficients are dequantized by the dequantizer 160 and inversely transformed by the inverse transformer 170. The dequantized, inversely transformed coefficients are added to the prediction block by the adder 175 and thus, the recovered block is generated.

The recovered block passes through the filter unit 180, wherein the filter unit 180 may apply at least one of a deblocking filter, a sample adaptive offset (SAO), an adaptive loop filter (ALF) to the recovered block or the recovered picture. The filter unit 180 may be referred to as an adaptive in-loop filter. The deblocking filter may remove block distortion occurring at a boundary between blocks. The SAO may add an optimal offset value to the pixel value so as to compensate for coding errors. The ALF may perform filtering based on a value obtained by comparing the recovered video with the original video and may also be performed only when the high efficiency coding is applied. The recovered block passing through the filter unit 180 is stored in the reference video buffer 190.

Figure 2:
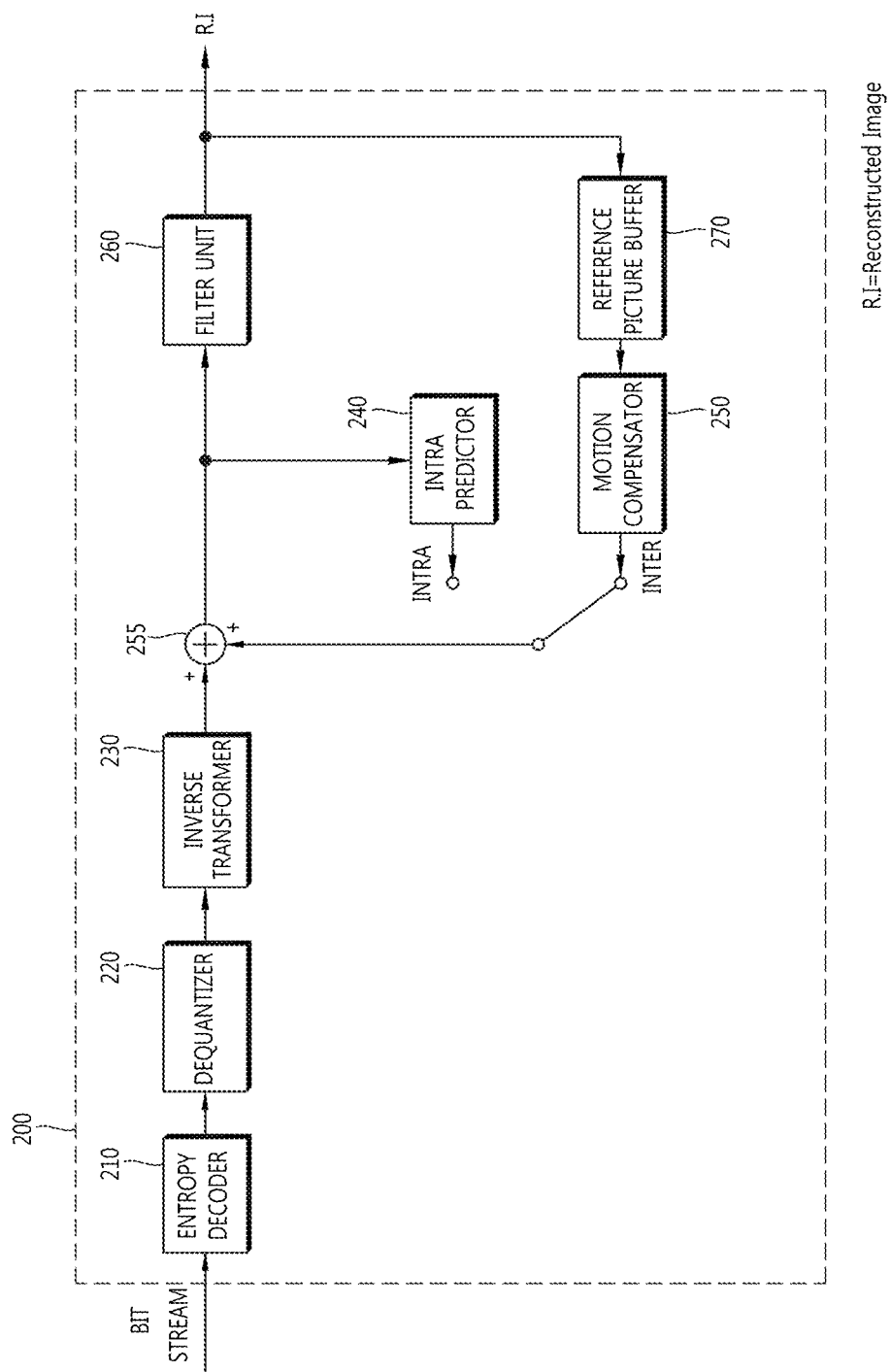
FIG. 2 is a block diagram illustrating a configuration of a video decoding apparatus in accordance with another exemplary embodiment of the present invention.

FIG. 2 is a block diagram illustrating a configuration of a video decoding apparatus in accordance with another exemplary embodiment of the present invention.

Referring to FIG. 2, an apparatus 200 for decoding video includes an entropy decoder 210, a dequantizer 220, an inverse transformer 230, an intra predictor 240, a motion compensator 250, a filter unit 260, and a reference video buffer 270.

The apparatus 200 for decoding video may receive the bit streams output from the encoder and perform the decoding in the intra mode or the inter mode to output the reconstructed video, that is, the recovered video. In the case of the intra mode, the prediction block is generated using the intra prediction mode and in the case of the inter mode, the prediction block is generated using the inter prediction method. The apparatus 200 for decoding video may obtain the residual block from the received bit streams, generate the prediction block, and then add the prediction block to the residual block to generate the reconstructed block, that is, the recovered block.

The entropy decoder 210 performs the entropy decoding on the input bit stream according to the probability distribution to output the quantized coefficients. The quantized coefficients may be dequantized by the dequantizer 220 and be inversely transformed by the inverse transformer 230. In this case, the quantized coefficients may be dequantized/inversely transformed to generate the residual block.

As described above, the prediction object block may be divided into a block transmitted by encoding only the information in which the prediction object block is constructed (generated) by only the prediction value and a block transmitted by being encoded together with the residual block information. In this case, the predetermined flag is decoded by the entropy decoder so as to determine whether the prediction object block is encoded together with the residual block information and it may be determined whether the residual block is decoded or the residual block is not decoded, on the basis of a decoded intra skip flag. For example, (1) when the intra skip flag is 0, the prediction object block is a block in which the residual block is also encoded and therefore, the entropy decoder decodes, dequantizes, and inversely transforms the residual block information and then, adds the information to the prediction value of the prediction object block generated from the predictor, thereby making it possible to recover the video. (2) When the intra skip flag is 1, the prediction object block is a block in which the residual block is not encoded and the recovered video may be generated by only the prediction value of the prediction object block generated from the predictor.

In the case of the intra prediction mode, the intra predictor 240 (alternatively, the inter-picture predictor) generates the prediction block by performing the spatial prediction using pixel values of the already encoded block around the current block.

In the case of the inter prediction mode, the motion compensator 250 may perform the motion compensation using the motion vector and the reference video stored in the reference video buffer 270 to generate the prediction block.

The residual block and the prediction block are added by the adder 255 and the added block passes through the filter unit 260. The filter unit 260 may be applied to at least one of the deblocking filter, the SAO, and the ALF to the recovered block or the recovered picture. The filter unit 260 outputs the reconstructed video, that is, the recovered video. The recovered video may be stored in the reference video buffer 270 to be used for the inter prediction.

As a method for improving prediction performance of the encoding/decoding apparatus, there are a method for increasing accuracy of interpolation video and a method for predicting a difference signal. Here, the difference signal is a signal representing the difference between the original video and the prediction video. In the specification, the "difference signal" may alternatively be used as the "differential signal", the "residual block", or the "differential block" according to the syntax, which may be differentiated by a person skilled in the art to which the present invention pertains within the range not affecting the idea and essence of the present invention.

As described above, in the exemplary embodiment of the present invention, a coding unit is used as an encoding unit for convenience of explanation, but may also be a unit performing the encoding and the decoding. The meaning of each component included in the video encoder and the video decoder may also include a hardware meaning as well as a software processing unit that may be performed through an algorithm.

In addition, the video encoding apparatus and the video decoding apparatus may be used to encode and decode video information of a three-dimensional video encoding and decoding method, for example, depth video information, multi-view video information. Therefore, the video encoded and decoded in the exemplary embodiment of the present invention may be the depth information video including a depth information map and may also be video including luminance information or color difference information.

In the exemplary embodiment of the present invention, the video encoding method and the video decoding method to be described below may be performed in each component included in the video encoder and the video decoder that are described above in FIGS. 1 and 2. The meaning of components may include the hardware meaning as well as the software processing unit that may be performed through an algorithm.

Figure 3:
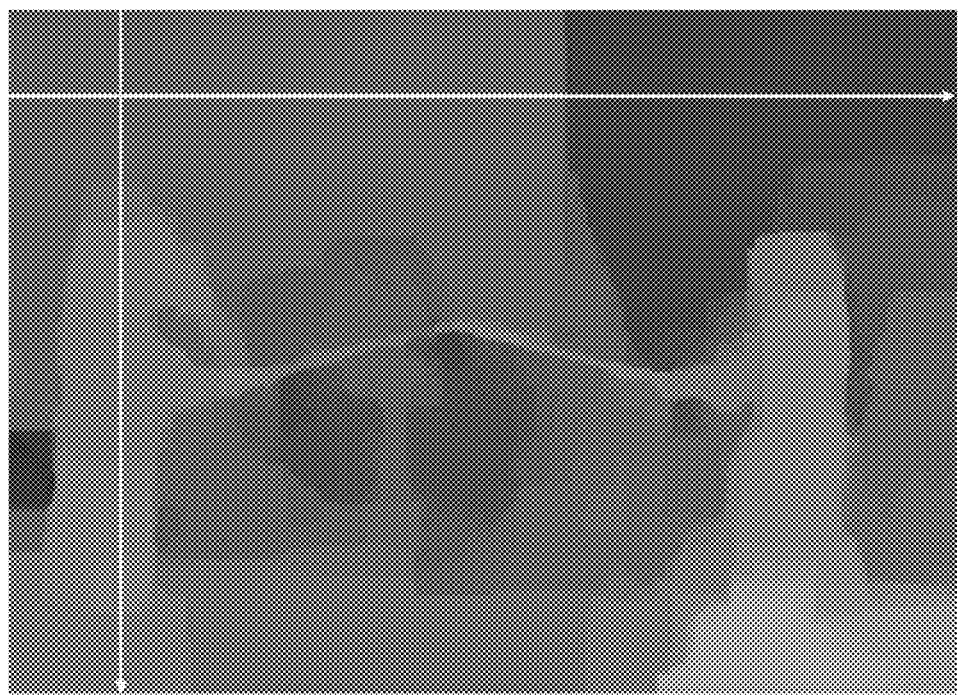
FIG. 3 is an image illustrating a depth information video in accordance with an exemplary embodiment of the present invention.

FIG. 3 is an image illustrating a depth information video in accordance with an exemplary embodiment of the present invention.

Referring to FIG. 3, the depth information map includes the information representing a distance between a camera and an object and therefore, inter-pixel correlation is very high. In particular, the same depth information may be widely represented in an object or a background part.

Figure 4:
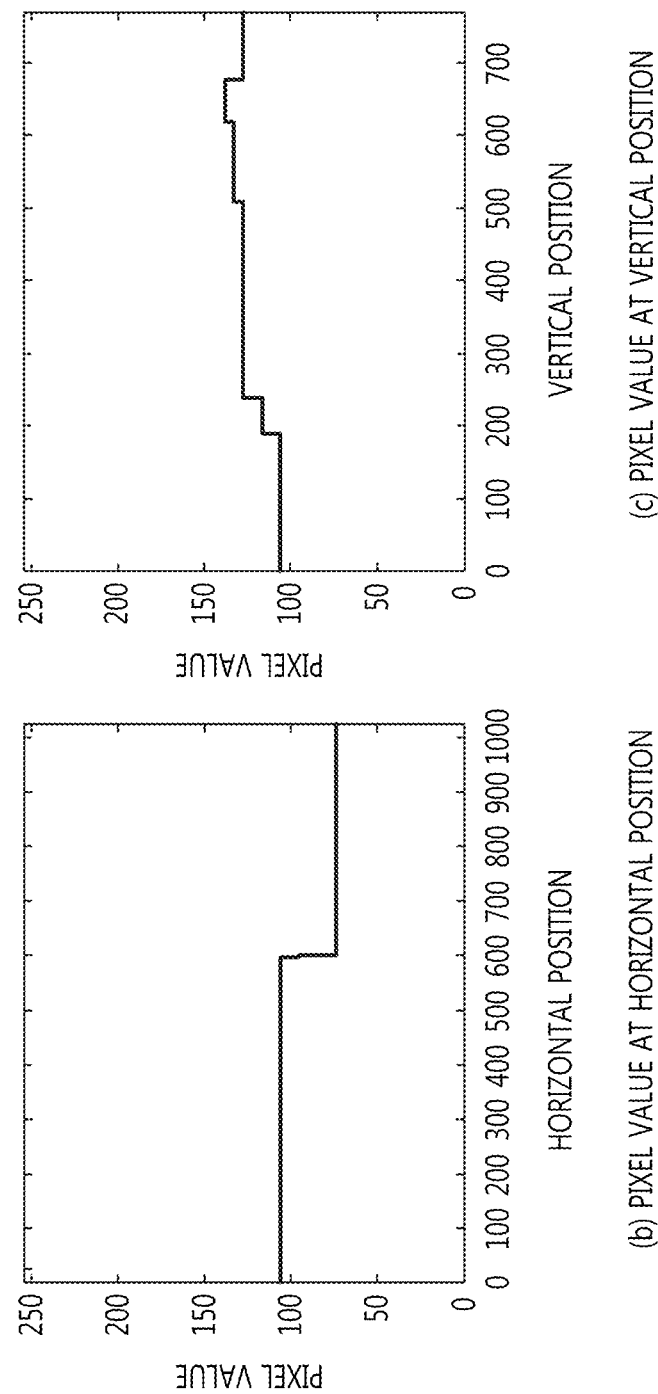
FIG. 4 is a graph illustrating a direction of an image and pixel similarity in accordance with an exemplary embodiment of the present invention.

FIG. 4 is a graph illustrating a direction of an image and pixel similarity in accordance with the exemplary embodiment of the present invention.

The graph of FIG. 4 represents a 2D graph representing values of each pixel in a horizontal direction or a vertical direction from any position of the video depth information video of FIG. 3. It can be appreciated from the graph that the depth information map has very high inter-pixel correlation with peripheral blocks and the values of the depth information in the object of the depth information map and at the background part are similar to one another.

When the intra prediction is performed in the video having the high inter-pixel correlation, the pixel value of the prediction object block may be substantially predicted using only the pixel values of the peripheral blocks and therefore, the encoding process and the decoding process for the residual signal that is the difference value between the current block and the prediction block are not required. Therefore, the information in which the prediction object block is constructed (generated) by only the prediction value without transmitting the residual block information according to the video characteristics may be transmitted to the decoder and the encoding efficiency may be increased by the above-mentioned method.

The exemplary embodiment of the present invention discloses an encoding method for reducing calculation complexity and improving the encoding efficient at the time of performing the intra prediction encoding on the video having the high inter-pixel correlation like the depth information video. The exemplary embodiment of the present invention may also be applied to the video information including a luminance sample or a color difference sample rather than the depth information video, which is included in the scope of the present invention.

Hereinafter, in the exemplary embodiment of the present invention, the block that is an object of the intra prediction is defined as the term called the prediction object block, the block generated by performing the intra prediction on the prediction object block is defined as the term called the prediction block, the block that is the prediction block is defined as the term called the original block, and the block that represents the difference between the prediction block and the original block is defined as the term called the residual block.

Figure 5:
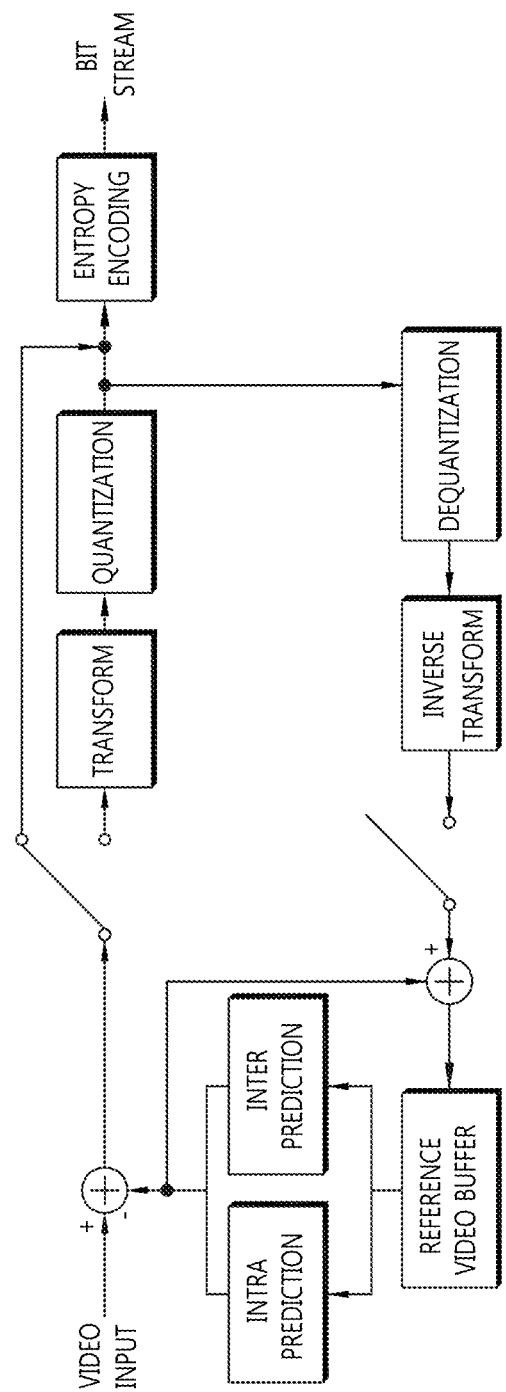
FIG. 5 is a conceptual diagram illustrating a block encoding method in accordance with an exemplary embodiment of the present invention.

FIG. 5 is a conceptual diagram illustrating a block encoding method in accordance with an exemplary embodiment of the present invention.

Referring to FIG. 5, the video may be encoded by selecting one of the method (1) for encoding the residual block that is the difference value between the prediction block and the input video generated by the predictor (inter prediction and intra prediction) and the method (2) for encoding only the prediction block generated by the predictor (inter prediction and intra prediction). Whether the encoding for the generated residual block is performed or whether the video is encoded using only the prediction block may be represented based on syntax element information like the predetermined flag information. Hereinafter, the syntax element information is defined as the term called the intra skip flag.

The above-mentioned method (1) may perform the transform, the quantization, and the entropy encoding on the residual block for the prediction object block at the time of performing the transform and the quantization on the residual block to generate the bit stream. The transformed and quantized block may be included in the buffer by being subjected to the inverse transform and the dequantization so as to be again used for the prediction.

The above-mentioned method (2) does not encode the prediction block generation information (for example, in the case of the intra prediction, the intra prediction mode information and in the case of the inter prediction, the motion vector, the reference picture index information, or the like) when the transform and the quantization for the residual block is not performed, that is, when the encoding for the residual block is not performed and the prediction block generation information may be induced through the peripheral blocks of the current block. For example, when the prediction object block uses the intra prediction, the intra prediction mode information of the current prediction object block may be induced based on the intra prediction mode information of the peripheral blocks to generate the prediction block at the decoding end.

Another method may encode the prediction block generation information (for example, in the case of the intra prediction, the intra prediction mode information and in the case of the inter prediction, the motion vector, the reference picture index information, or the like) when the transform and the quantization for the residual block is not performed, that is, when the encoding for the residual block is not performed and transmit the encoded prediction block generation information to the decoder.

In the case of the videos similar to the peripheral videos, the block similar to the original block may be generated by only the prediction block and therefore, the recovered prediction block may be used as the recovered video information without performing the transform, the quantization, and the entropy encoding on the residual block. The information regarding whether the encoding is performed on the residual blocks may be represented as the intra skip flag that is the syntax element information.

The decoder may decode the information like the intra skip flag to determine whether the entropy decoding is performed on the residual blocks.

Figure 6:
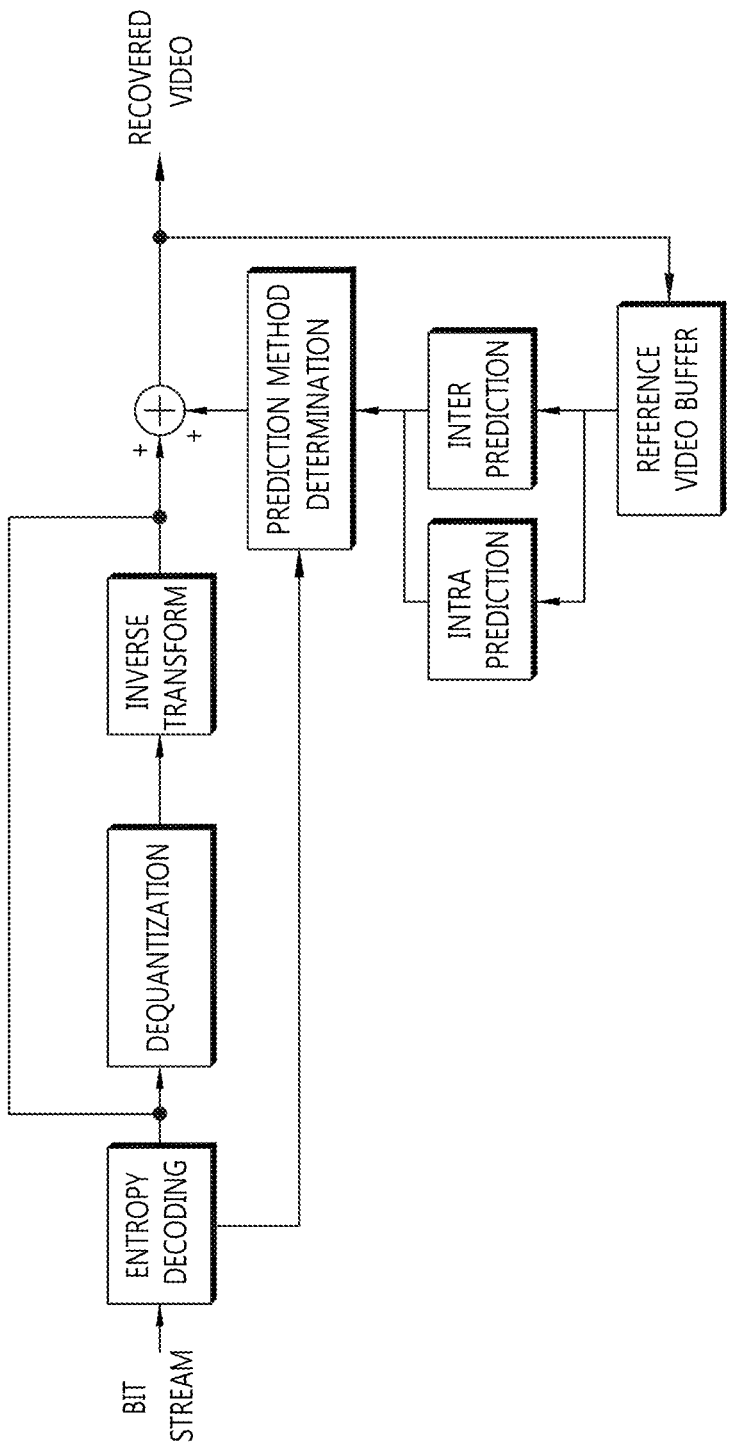
FIG. 6 is a conceptual diagram illustrating a block decoding method in accordance with an exemplary embodiment of the present invention.

FIG. 6 is a conceptual diagram illustrating a block decoding method in accordance with an exemplary embodiment of the present invention.

Referring to FIG. 6, the intra skip flag is decoded by the entropy decoder and it may be determined whether the residual blocks and prediction block generation information are decoded or the residual blocks and prediction block generation information are not decoded, on the basis of the decoded intra skip flag. In addition, the intra skip flag is decoded by the entropy decoder and it may be determined whether the residual blocks are decoded or the residual blocks are not decoded, on the basis of the decoded intra skip flag.

(1) When the intra skip flag is 0, the prediction object block is a block in which the residual blocks are also encoded and therefore, the entropy decoder decodes, dequantizes, and inversely transforms the residual block information and then, adds the information to the prediction value of the prediction object block generated from the predictor, thereby making it possible to recover the video.

(2) When the intra skip flag is 1, the prediction object block is a block in which the residual blocks are not encoded and the recovered video may be generated by only the prediction value of the prediction object block generated from the predictor. In this case, in order to generate the prediction value of the prediction object block, the prediction block generation information (for example, intra prediction mode information) is induced from the peripheral blocks without being encoded or the prediction block generation information may be encoded so as to be transmitted to the decoding end. For example, the intra prediction mode information of the peripheral blocks is used as the intra prediction mode information of the prediction object block or the average value of the reference pixel may be used as the intra prediction value of the prediction object block.

In accordance with the exemplary embodiment of the present invention, the intra prediction method that may be used in the above-mentioned encoder and decoder is disclosed in FIGS. 5 and 6.

Figure 7:
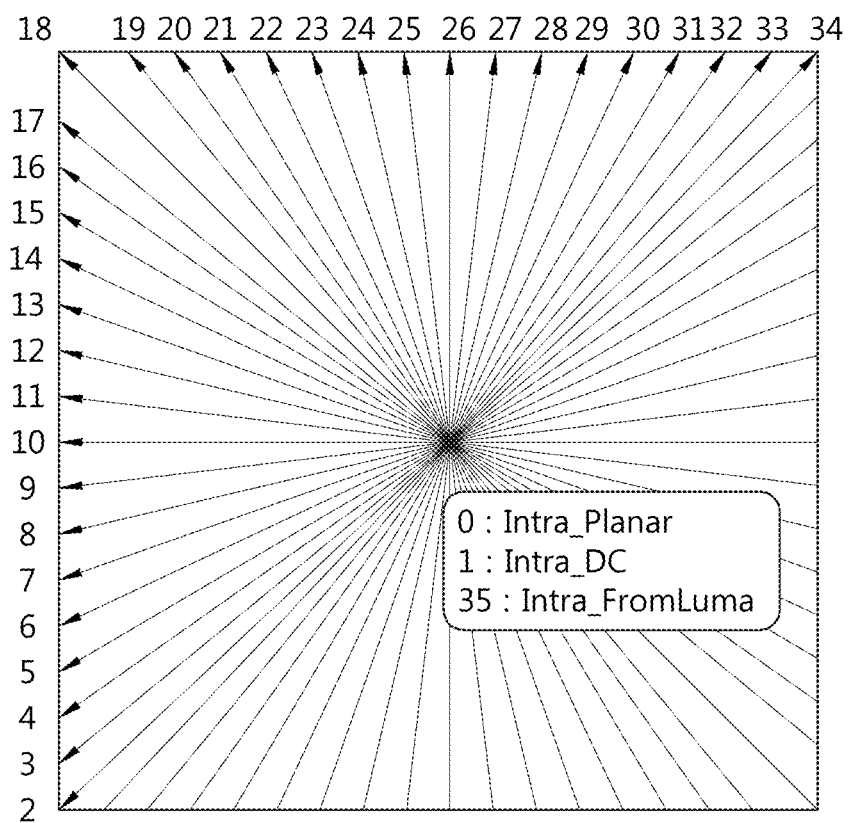
FIG. 7 is a conceptual diagram illustrating a directional intra prediction mode in accordance with an exemplary embodiment of the present invention.

Hereinafter, Table 1 and FIG. 7 illustrate the intra prediction mode that may be used in the exemplary embodiment of the present invention. However, Table 1 and FIG. 7 illustrate the intra prediction mode and the intra prediction mode used in the exemplary embodiment of the present invention is not limited to the intra prediction mode disclosed in FIG. 7.

Table 1 illustrates mapping between the intra prediction mode number and the intra prediction mode.

TABLE 1

| Intra prediction mode | Associated names |
| --- | --- |
| 0 | Intra_Planar |
| 1 | Intra_DC |
| Otherwise (2 . . . 34) | Intra_Angular |
| 35 | Intra_FromLuma (used only for chroma) |

Referring to Table 1, in order to perform the intra prediction on the prediction object block, the luminance block may use 35 intra prediction modes of the screen. Among those, No. 2 intra prediction mode to No. 34 intra prediction mode, which is the directional intra prediction mode, may perform the intra prediction based on the reference pixel in different directions. No. 0 and No. 1, which is the non-directional intra prediction mode, generates the prediction pixel value of the prediction object block by using the reference pixel to perform the intra prediction. Here, the prediction mode number for the intra mode is an indicator, wherein each prediction mode is not limited to a specific number.

FIG. 7 is a conceptual diagram illustrating a directional intra prediction mode in accordance with an exemplary embodiment of the present invention.

Referring to FIG. 7, the directional intra prediction mode may allocate the intra prediction mode value from No. 34 intra prediction mode in a clockwise direction, starting from No. 2 intra prediction mode in the lower left direction.

Figure 8:
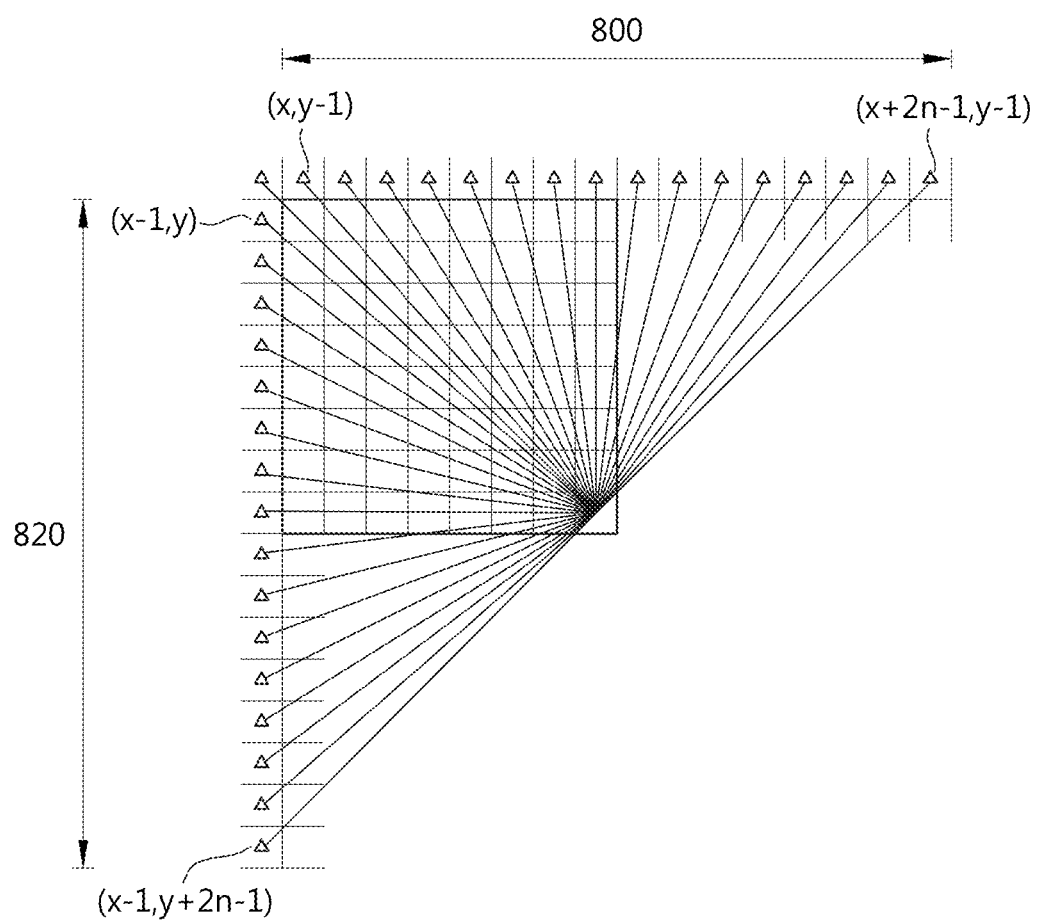
FIG. 8 is a conceptual diagram illustrating an intra prediction method in accordance with an exemplary embodiment of the present invention.

FIG. 8 is a conceptual diagram illustrating an intra prediction method in accordance with an exemplary embodiment of the present invention.

Referring to FIG. 8, the intra prediction may be performed based on the peripheral reference pixel values of the prediction object block.

When the peripheral reference pixel values may be a 2n upper reference pixel 800 from (x, y−1) to (x+2n−1, y−1) and a 2n left reference pixel 820 from (x−1, y) to (x−1, y+2n−1) when coordinates of the pixel positioned at the upper left of the prediction object block having, for example, an N×N size are set to be (x, y).

In accordance with the exemplary embodiment of the present invention, the intra prediction may be performed using the left reference pixel present at the left of the prediction object block and the upper reference pixel present at the upper of the prediction object block.

When the left reference pixel present at the left of the prediction object block and the upper reference pixel present at the upper of the prediction object block are not available, the intra prediction may be performed by padding the reference pixel. For example, like No. 34 intra prediction mode, the reference pixel for performing the intra prediction may be pixels that are not currently decoded. As another example, when the prediction block is positioned at a boundary of an LCU, there may be the case in which the pixel from n to upper 2n−1 or the pixel from n to left 2n−1 are not available. In this case, the reference pixel for performing the intra prediction is not present and therefore, the reference pixel value may be generated by padding the currently available pixel value into the non-available pixel value.

Figure 9:
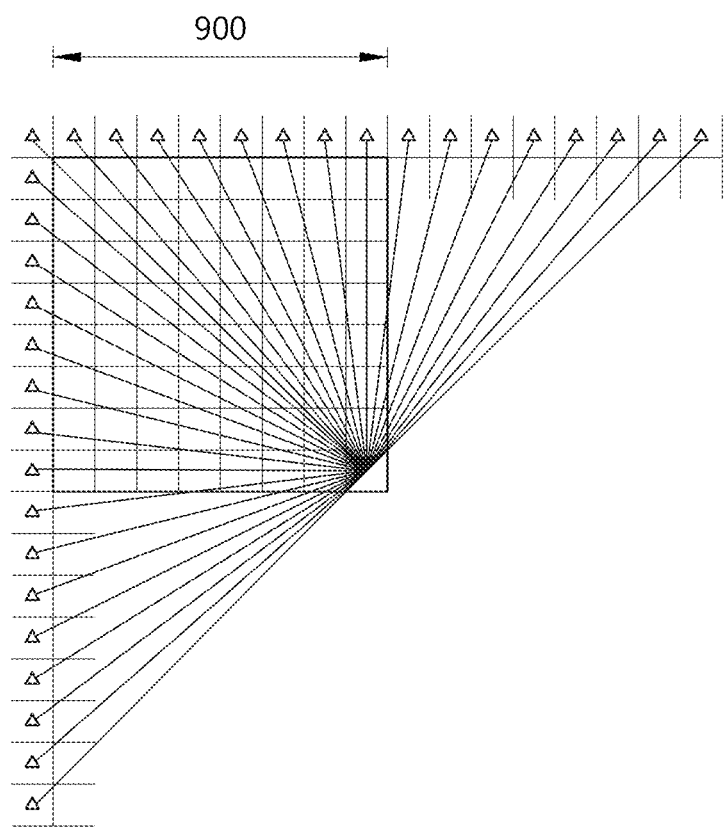
FIG. 9 is a conceptual diagram illustrating an intra prediction method in accordance with an exemplary embodiment of the present invention.

FIG. 9 is a conceptual diagram illustrating an intra prediction method in accordance with an exemplary embodiment of the present invention.

Referring to FIG. 9, the intra prediction may perform by only a part of the reference pixels and the information of the used reference pixel may be encoded and transmitted to the decoding end. For example, the prediction value of the prediction object block is calculated by the average value of the reference pixel value but the reference pixel value for calculating the average value may be selectively used. When the intra prediction is performed using only the upper reference pixel, an average value of an upper reference pixel 900 may be used as the prediction value of the prediction object block and the information in which the upper reference pixel is used for the prediction by the encoder may be induced in the decoding end by using the correlation of the peripheral reference pixel values of the prediction object block. In addition, when the intra prediction is performed using only the upper reference pixel, the average value of the upper reference pixel 900 may be used as the prediction value of the prediction object block and the information in which the upper reference pixel is used for the prediction by the encoder may be encoded and transmitted to the decoding end. In this case, the encoder may not transmit the prediction block generation information (for example, the intra prediction mode information).

The reference pixel value illustrated in FIG. 9 is by way of example. Therefore, other reference pixel values (for example, the left reference pixel value or a part of the reference pixels) may be used for the prediction and various values such as an average value or an intermediate value obtained by allocating a weight value to the reference pixel rather than the average value of the pixels may be used as the prediction value of the prediction object block.

Figure 10:
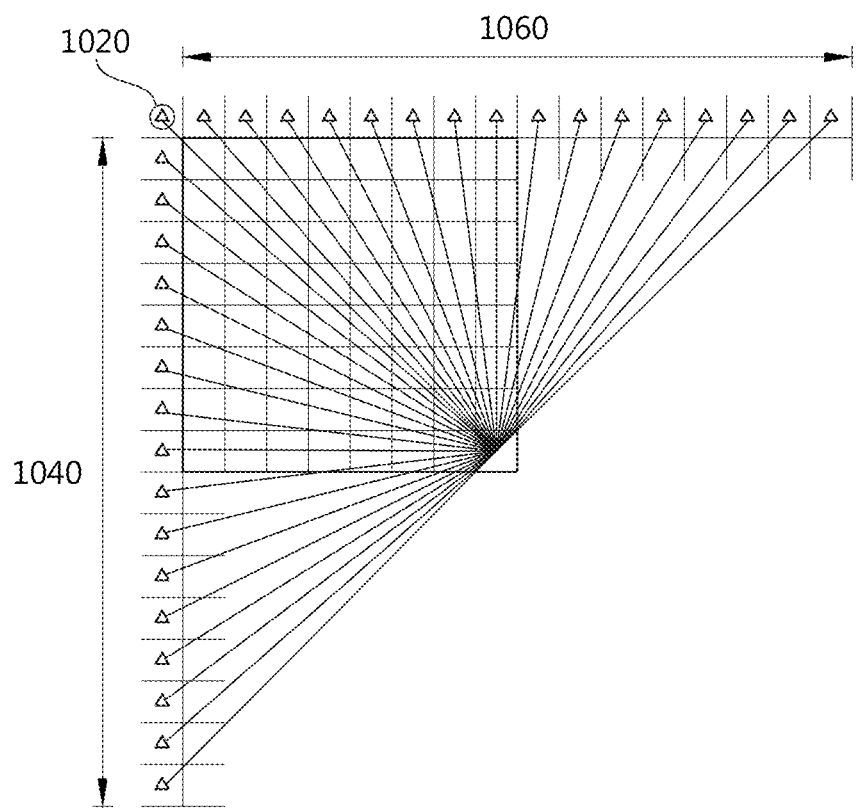
FIG. 10 is a conceptual diagram illustrating an intra prediction method in accordance with an exemplary embodiment of the present invention.

FIG. 10 is a conceptual diagram illustrating an intra prediction method in accordance with an exemplary embodiment of the present invention.

Referring to FIG. 10, the reference pixel information may be used so as to perform the intra prediction on the prediction object block. For example, the reference pixel to be used for the intra prediction may be determined in the prediction object block by determining whether any of two values is larger by comparing the difference value between a reference pixel 1020 positioned at the upper left of the prediction object block and a left reference pixel 1040 and the difference value between the reference pixel 1020 positioned at the upper left of the prediction object block and an upper reference pixel 1060.

The case in which the difference value between the reference pixel 1020 positioned at the upper left of the prediction object block and the left reference pixel 1040 is smaller than the difference value between the reference pixel 1020 positioned at the upper left of the prediction object block and the upper reference pixel 1060 means that the pixel value is greater changed in the upper reference pixel direction than in the left reference pixel direction and as a result, the intra prediction may be performed by using the upper reference pixel for the intra prediction. On the other hand, the case in which the difference value between the reference pixel 1020 positioned at the upper left of the prediction object block and the left reference pixel 1040 is larger than the difference value between the reference pixel 1020 positioned at the upper left of the prediction object block and the upper reference pixel 1060 means that the pixel value of the left reference pixel direction is greatly changed and as a result, the intra prediction may be performed by using the left reference pixel for the intra prediction.

Further, the opposite is also possible. For example, the case in which the difference value between the reference pixel 1020 positioned at the upper left of the prediction object block and the left reference pixel 1040 is smaller than the difference value between the reference pixel 1020 positioned at the upper left of the prediction object block and the upper reference pixel 1060 means that the pixel value is greater changed in the upper reference pixel direction than in the left reference pixel direction and as a result, the intra prediction may be performed by using the left reference pixel for the intra prediction.

When the difference value between the reference pixel 1020 positioned at the upper left of the prediction object block and the left reference pixel 1040 and the difference value between the reference pixel 1020 positioned at the upper left of the prediction object block and the upper reference pixel 1060 have little difference from each other, the intra prediction may be performed by using a planar mode or a DC mode that is an non-directional prediction mode.

In accordance with another exemplary embodiment of the present invention, the value arithmetically calculated by mixing several prediction methods may be used the intra prediction value of the block, upon performing the intra prediction by using the intra prediction.

For example, the intra prediction may be performed by using the average value or of values calculated by using the intra prediction value predicted by the plurality of intra prediction modes or a sum of weight values.

Figure 11:
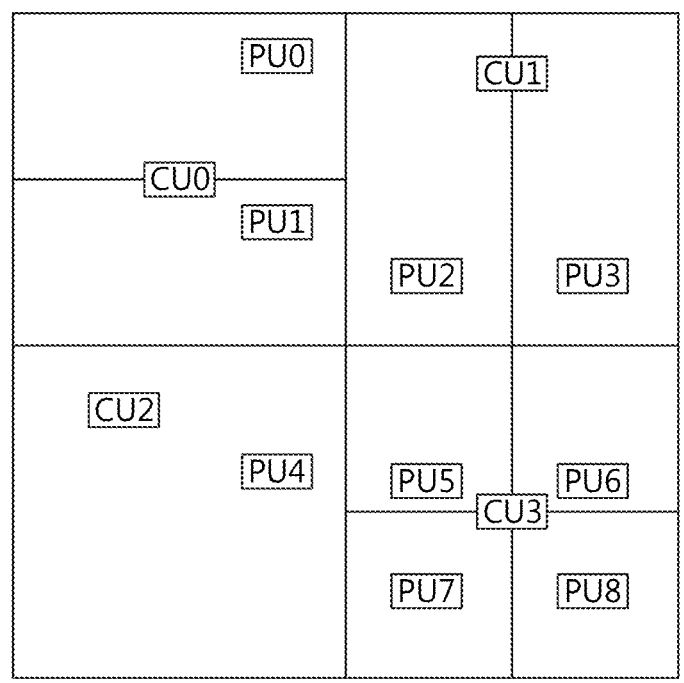
FIG. 11 is a conceptual diagram illustrating a method for determining whether a residual block is generated in accordance with an exemplary embodiment of the present invention.

FIG. 11 is a conceptual diagram illustrating a method for determining whether residual blocks are generated in accordance with an exemplary embodiment of the present invention.

In accordance with the exemplary embodiment of the present invention, the block may be recovered only by the prediction blocks without generating the residual blocks according to the video. In this case, whether the recovered block is a block recovered by only the prediction block or a block generating the original block based on the prediction block by the residual block value should be determined. In this case, so as to encode whether the prediction object block is a block generating the residual blocks or is a block configured of only the prediction block, the encoding related information of the peripheral blocks may be used.

Referring to FIG. 11, a single LCU may be divided into a plurality of CUs, wherein the single CU may be divided into a plurality of PUs. The single prediction blocks may perform the intra prediction or the inter prediction and the residual block that is the difference value with the original block may be generated based on the prediction block calculated by the prediction method. In accordance with the exemplary embodiment of the present invention, the plurality of PUs included in the single LCU may be configured of only the prediction block and the information in which the prediction block generation information is not separately transmitted may be transmitted to the decoder, only the prediction block information may be encoded and transmitted to the decoder, or both of the prediction block generation information and the residual block information may be encoded and transmitted to the decoder. The information related to whether the residual block for each prediction block is transmitted may be decoded based on the predetermined syntax element. When the information related to whether the residual block information is transmitted is encoded, the information related to whether the residual blocks of the peripheral blocks are transmitted is subjected to the entropy encoding, the video information may be transmitted by using a small number of bits while reflecting the tendency of the video.

For example, each PU may transmit the information related to whether the residual block is transmitted as the predetermined flag information. Upon decoding the flag information, the entropy decoding may be performed based on whether the residual blocks of the peripheral blocks are transmitted by using the entropy encoding method such as CABAC, CAVLC. The information regarding whether the residual block of the block is transmitted may be transmitted while reflecting the predetermined tendency present in the video by encoding the prediction object block based on the video information on the plurality of blocks of the peripheral blocks.

The following Table 2 shows a syntax structure representing a method for transmitting the information regarding whether the residual block of the block is transmitted. In the following syntax, mb represents a specific block unit and is not limited to a macro block and therefore, may be a prediction unit such as the PU and may be various block units according to the implementation. Further, the syntax element to be described below may be represented in various syntax element types having the same or similar meaning and the syntax element information performing the following role or the syntax element information for implementing the principle of the present invention is included in the scope of the present invention.

TABLE 2

| slice_data( ) { | C | Descriptor |
|---|---|---|
| ~~~ | | |
| else if( slice_type = I ‖ slice_type = SI ) | | |
| { | | |
| if( !entropy_coding_mode_flag ) { | | |
| mb_intra_skip_run | 2 | ue(v) |
| prevMbSkipped = ( mb_skip_run > 0 ) | | |
| for( i=0; i<mb_skip_run; i++ ) | | |
| CurrMbAddr = NextMbAddress( CurrMbAddr ) | | |
| moreDataFlag = more_rbsp_data( ) | | |
| } else { | | |
| mb_intra_skip_flag | 2 | ae(v) |
| moreDataFlag = !mb_intra_skip_flag | | |
| } | | |
| } | | |
| ~~~ | | |
| if( slice_type = I ‖ slice_type = SI ) | | |
| prevMbSkipped = mb_intra_skip_flag | | |
| ~~~ | | |

Referring to Table 2, the block information may be decoded by differentiating the slice type information so as to encode whether the block included in the corresponding video unit includes the residual block information in the predetermined upper level syntax structure like the slice level.

For example, when the slice type is not configured of only the intra prediction block (ii), it may be represented whether the block is a block encoded including the residual block information by using the syntax element mb_skip_run and mb_skip_flag according to the entropy encoding method entropy_coding_mode_flag. The intra skip flag may be defined as the term including the syntax element mb_skip_run and the mb_skip_flag.

The mb_skip_run is a flag used when using the CAVLC as the entropy encoding method. For example, when the mb-skip_run value is 1, it is a block configured of only the prediction block information without transmitting the residual block information and when the mb_skip_run value is 0, it may be used as a meaning called a block transmitting the residual block information. The mb_skip_flag is a flag used when using the CABAC as the entropy encoding method. For example, when the mb-skip_flag value is 1, it is a block configured of only the prediction block information without transmitting the residual block information and when the mb_skip_flag value is 0, it may be used as a meaning called a block transmitting the residual block information.

Even when the slice type is not configured of only the intra prediction block as the I slice, it may be represented whether the block is a block encoded including the residual block information by using the syntax element mb_intra_skip_run and mb_intra_skip_flag according to the entropy encoding method entropy_coding_mode_flag.

The mb_intra_skip_run is a flag used when using the CAVLC as the entropy encoding method. For example, when the mb_intra_skip_run value is 1, it is a block configured of only the prediction block information without transmitting the residual block information and when the mb_intra_skip_run value is 0, it may be used as a meaning called a block transmitting the residual block information. The mb_intra_skip_flag is a flag used when using the CABAC as the entropy encoding method. For example, when the mb_intra_skip_flag value is 1, it is a block configured of only the prediction block information without transmitting the residual block information and when the mb_intra_skip_flag value is 0, it may be used as a meaning called a block transmitting the residual block information.

Whether the previously encoded or decoded block is encoded including the residual block information is stored as prevMbskipped and may be used when performing the entropy encoding on the mb_intra_skip_run or the mb_intra_skip_flag that is the flag information of the next block.

The following Table 3 shows another syntax structure representing a method for transmitting the information regarding whether the residual block of the block is transmitted.

TABLE 3

| macroblock_layer( ) { | C | Descriptor |
|---|---|---|
| if( ! mb_skip_flag ) | | |
| intra_skip_flag | 2 | u(1) | ae(v) |
| if (!intra_skip_flag) { | | |

Referring to Table 3, when the mb_skip_flag or the mb_intra_skip_flag is 1, the residual block information is absent and therefore, the residual block information is not decoded and when the mb_skip_flag or the mb_intra_skip_flag is 0, the residual block information is present and therefore, the residual block may be decoded by the process of decoding the residual block information.

Figure 12:
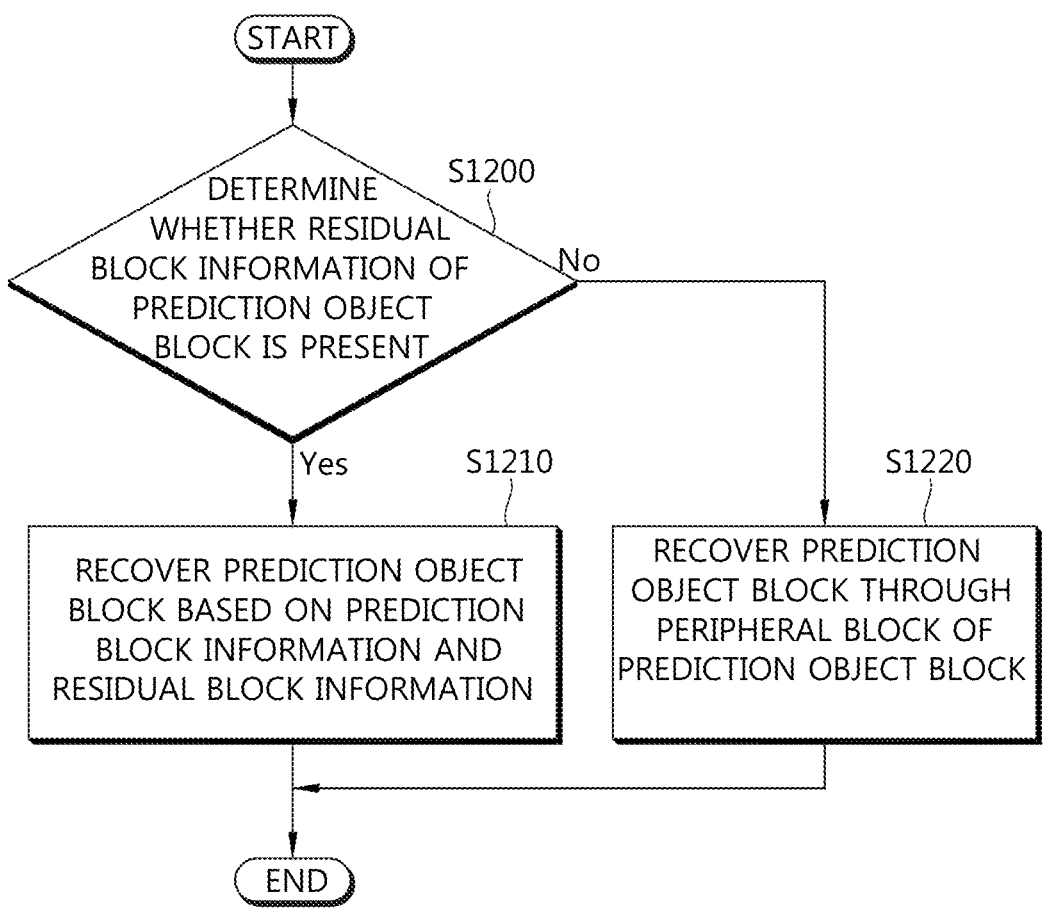
FIG. 12 is a flow chart illustrating a video decoding method in accordance with an exemplary embodiment of the present invention.

FIG. 12 is a flow chart illustrating a video decoding method in accordance with an exemplary embodiment of the present invention.

Referring to FIG. 12, it is determined whether the residual block information of the prediction object block is present (S1200).

In accordance with the exemplary embodiment of the present invention, the prediction object block may be divided into the block in which the residual block information is encoded together with the prediction block or the block in which only the prediction block is encoded, wherein the information may be subjected to the entropy decoding as the flag information.

The prediction object block may be divided into the block in which the residual block information is encoded together with the prediction block or the block in which only the prediction block is encoded, based on the entropy decoded information and may determine whether the residual block information is additionally decoded.

When the residual block information is present, the prediction object block is recovered based on the prediction block information and the residual block information (S1210).

When the residual block information is absent, the prediction block generation information is induced through the peripheral blocks of the prediction object block to recover the prediction object block (S1220).

Only the information in which the prediction object block is configured (generated) of only the prediction value is recovered based on the decoded information to generate the prediction block. As described above, when the method for generating the prediction block using the peripheral reference pixel information of the prediction object block is used, the decoder does not need to separately decode the information for generating the prediction block. In accordance with another exemplary embodiment of the present invention, it is possible to recover the prediction object block by decoding a value encoding the prediction block generation information such as the intra prediction mode information by the encoder.

Figure 13:
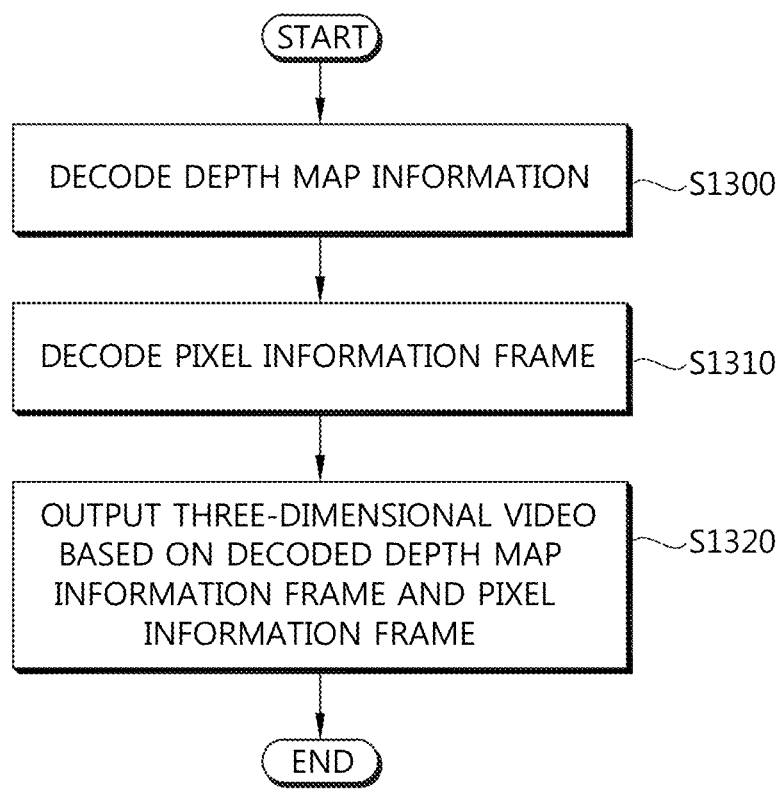
FIG. 13 is a conceptual diagram illustrating a method for recovering multi-dimensional video in accordance with an exemplary embodiment of the present invention.

FIG. 13 is a conceptual diagram illustrating a method for recovering a multi-dimensional video in accordance with an exemplary embodiment of the present invention.

Referring to FIG. 13, the depth map information is recovered so as to recover the multi-dimensional video (S1300).

The multi-dimensional video may be configured of a plurality of videos such as the depth map information and the pixel sample value information (luminance information video, color difference information video) The following exemplary embodiment describes the method that does not transmit the residual block information to only the depth map video based on the video information but the above-mentioned method may also be used for the pixel sample information and the exemplary embodiment is also included in the scope of the present invention.

The depth map information is the information related to the depth information of video and may be the video having the high correlation in the vertical or horizontal direction according to the video. As described above, in order to recover the depth map information, the prediction object block may be divided into the block in which the residual block information is encoded together with the prediction block or the block in which only the prediction block is encoded, based on the entropy decoded information and may determine whether the residual block information is additionally decoded. The information for generating the prediction block is encoded or transmitted or may be used by being induced from the peripheral recovered blocks.

A pixel information frame is recovered (S310).

The pixel information frame such as a luminance information frame, a color difference frame, or the like, may be recovered according to the configuration of the video.

A three-dimensional video frame is output based on the decoded depth map information frame and the pixel information frame (S1320).

The decoder may recover the three-dimensional video frame based on the decoded depth map information frame and the pixel information frame.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

The invention claimed is:

1. A video decoding method, comprising:
    decoding predetermined information indicating whether residual block information is encoded in a bitstream or not;
    determining whether residual block information for a target block of an image is present based on the predetermined information;
    generating the target block based on an intra prediction value and the residual block information in response to the predetermined information indicating that the residual block information is present; and
    generating the target block based on intra prediction direction information decoded from the bitstream in response to the predetermined information indicating that the residual block information is absent, wherein
    0 and 1 are values for the predetermined information to indicate whether the residual block information is encoded in the bitstream or not.

2. The video decoding method of claim 1, wherein the target block is generated using only the intra prediction value generated based on the intra prediction direction information of the target block in response to the predetermined information indicating that the residual block information is absent.

3. The video decoding method of claim 1, wherein the intra prediction value is a value calculated based on a reference pixel value of the target block and is a value predicted while having directivity according to an intra prediction mode or is an arithmetic average value or a weight average value of reference pixels.

4. A video decoding apparatus, comprising:
    an entropy decoder decoding predetermined information indicating whether residual block information is encoded in a bitstream or not; and
    a predictor determining whether residual block information for a target block is present based on the predetermined information, wherein
    the predictor generates the target block based on an intra prediction value and the residual block information for the target block in response to the predetermined information indicating that the residual block information is present,
    the entropy decoder decodes intra prediction direction information for the target block from the bitstream, and
    the predictor generates the target block based on the intra prediction direction information in response to the predetermined information indicating that the residual block information is absent, wherein
    0 and 1 are values for the predetermined information to indicate whether the residual block information is encoded in the bitstream or not.

5. The video decoding apparatus of claim 4, wherein the predictor generates the target block using only the intra prediction value generated based on the entropy-decoded intra prediction direction information of the target block in response to the predetermined information indicating that the residual block information is absent.

6. The video decoding apparatus of claim 4, wherein the intra prediction value is a value calculated based on a reference pixel value of the target block and is a value predicted while having directivity according to an intra prediction mode or is an arithmetic average value or a weight average value of reference pixels.

7. The video encoding method, comprising:
    generating predetermined information indicating whether residual block information is encoded in a bitstream or not;
    generating the target block based on an intra prediction value and a residual block corresponding the residual block information when the predetermined information indicates that the residual block information is present; and generating the target block based on intra prediction direction corresponding to intra prediction direction information in the bitstream when the predetermined information indicates that the residual block information is absent, wherein 0 and 1 are values for the predetermined information to indicate whether the residual block information is encoded in the bitstream or not.

8. The video encoding method of claim 7, wherein the target block is generated using only the intra prediction value generated based on the intra prediction direction when the predetermined information indicates that the residual block information is absent.

9. The video encoding method of claim 7, wherein the intra prediction value is a value calculated based on a reference pixel value of the target block and is a value predicted while having directivity according to a intra prediction mode or is an arithmetic average value or a weight average value of reference pixels.

10. A video encoding apparatus, comprising:

an entropy encoder encoding predetermined information indicating whether residual block information for a residual block is encoded in a bitstream or not; and a predictor determining whether the residual block is used to generate a target block or not, wherein the predictor generates the target block based on an intra prediction value and the residual block for the target block when the predetermined information indicates that the residual block information is present, the entropy encoder performs entropy encoding for intra prediction direction information indicating an intra prediction direction to generate entropy-encoded intra prediction direction information in the bitstream for the target block, and the predictor generates the target block based on the intra prediction direction when the predetermined information indicates that the residual block information is absent, wherein 0 and 1 are values for the predetermined information to indicate whether the residual block information is encoded in the bitstream or not.

11. The video encoding apparatus of claim 10, wherein the predictor generates the target block using only the intra prediction value generated based on the entropy-decoded intra prediction direction information of the target block when the predetermined information indicating that the residual block information is absent.

12. The video encoding apparatus of claim 10, wherein the intra prediction value is a value calculated based on a reference pixel value of the target block and is a value predicted while having directivity according to a intra prediction mode or is an arithmetic average value or a weight average value of reference pixels.

13. A non-transitory computer-readable medium storing a bitstream, the bitstream comprising:

predetermined information indicating whether residual block information is encoded in the bitstream or not, wherein whether residual block information for a target block of an image is present is determined based on the predetermined information;

the target block is generated based on an intra prediction value and the residual block information in response to the predetermined information indicating that the residual block information is present; and the target block is generated based on intra prediction direction information decoded from the bitstream in response to the predetermined information indicating that the residual block information is absent, wherein 0 and 1 are values for the predetermined information to indicate whether the residual block information is encoded in the bitstream or not.

14. The non-transitory computer-readable medium of claim 13, wherein the predictor generates the target block using only the intra prediction value generated based on the entropy-decoded intra prediction direction information of the target block in response to the predetermined information indicating that the residual block information is absent.

15. The non-transitory computer-readable medium of claim 13, wherein the intra prediction value is a value calculated based on a reference pixel value of the target block and is a value predicted while having directivity according to an intra prediction mode or is an arithmetic average value or a weight average value of reference pixels.

* * * * *